United States Patent Office 3,037,033
Patented May 29, 1962

3,037,033
4-METHYL-2-OXYGENATED-Δ¹,³,⁵⁽¹⁰⁾-ESTRATRI-
ENES AND PREPARATION THEREOF
Robert L. Clarke, Bethlehem, N.Y., assignor to Sterling
Drug Inc., New York, N.Y., a corporation of Delaware
No Drawing. Filed Aug. 21, 1961, Ser. No. 132,593
15 Claims. (Cl. 260—397.4)

This invention relates to estratriene compounds and in particular is concerned with compounds having the formula:

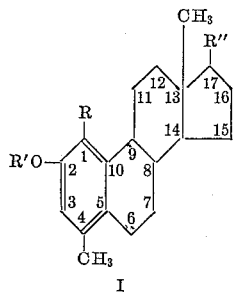

wherein R is hydrogen, hydroxy, lower-alkoxy or lower-alkanoyloxy; R' is hydrogen, lower-alkyl or lower-alkanoyl; and R" is (H)(β-OH), (H)(β-O-lower-alkanoyl) or O. The invention also relates to methods of preparation of the foregoing compounds.

When the compounds of Formula I have alkoxy groups in either or both of the 1- and 2-positions, said alkoxy groups preferably contain from one to about six carbon atoms, thus including, for example, methoxy, ethoxy, propoxy, isopropoxy, butoxy, pentyloxy, hexyloxy, and the like groups. When the compounds of Formula I have lower-alkanoyloxy groups in any of the 1-, 2- and 17-positions, said lower-alkanoyloxy groups preferably contain from one to about six carbon atoms, thus including, for example, formyloxy, acetoxy, propionoxy, butyryloxy, isobutyryloxy, valeryloxy, caproyloxy, and the like groups.

It has been reported that the rearrangement of 2β-hydroxytestosterone diacetate by means of p-toluenesulfonic acid in boiling methanol produces 17β-hydroxyandrostane-3,6-dione. Surprisingly, when the epimeric 2α-hydroxytestosterone (Formula II below) or its diacetate is treated under the same conditions, a very dissimilar product is obtained, namely, 2-methoxy-4-methyl-1,3,5(10)-estratrien-17β-ol (Formula III below; R' is CH₃).

The structure of the latter compound was proved in the following manner. The elementary analyses and ultraviolet spectrum (maxima at 278 and 285 mμ) showed the presence of an aromatic ring A, and required the presence of a methyl group and a methoxy group in the aromatic ring, one of which must be in the 2- or the 3-position of the steroid nucleus. Cleavage of the methoxy group with pyridine hydrochloride gave the free phenolic compound (Formula III below; R' is H), and the phenolic hydroxy group was removed (replaced by hydrogen) by sodium-ammonia reduction of the phosphate ester to yield what was identified as 4-methyl-1,3,5(10)-estratrien-17β-ol, also obtained by an independent synthesis. This proved that the methyl group was in the 4-position and that the methoxy group in the initial rearrangement product was either in the 2- or the 3-position.

When 17β-hydroxy-2-methoxy-1,4-androstadiene (Formula IV below; R' is CH₃) was treated with lithium aluminum hydride in tetrahydrofuran and then chromatographed on activated magnesium silicate ("Florisil"), there was produced a product identical with that obtained by the above-mentioned rearrangement of 2α-hydroxytestosterone. The only reasonable structure from the former rearrangement is a 2-methoxy compound; hence the product may be assigned the structure 2-methoxy-4-methyl-1,3,5(10)-estratrien-17β - ol. Unequivocal proof was furnished by a nuclear magnetic resonance spectrum. The latter spectrum showed a quartet of bonds in the aromatic proton region with the center two bonds more intense than the outer two and a coupling constant of 2. This is consistent with the presence of meta-oriented protons as in the aromatic ring system of Formula III below.

The reductive-rearrangement of a 17β-hydroxy-2-lower-alkoxy-1,4-androstadien-3-one with lithium aluminum hydride to produce a 2-lower-alkoxy-4-methyl-1,3,5(10)-estratrien-17β-ol takes place in an inert reaction medium at a temperature between about 50° C. and 150° C.

The transformations are set forth on the flow sheet below:

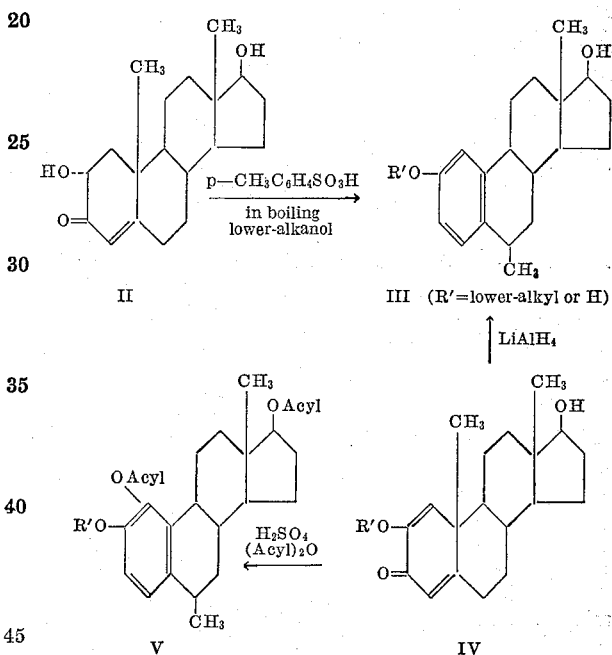

In another attempt to convert 17β-hydroxy-2-methoxy-1,4-androstadiene (IV; R' is CH₃) to 2-methoxy-4-methyl-1,3,5(10)-estratrien-17β-ol (III; R' is CH₃), the former was treated with acetic anhydride in the presence of sulfuric acid. A normal aromatization reaction took place, and the compound obtained was identified as 1,17β-diacetoxy-2-methoxy-4-methyl-1,3,5(10) - estratriene (V; R' is CH₃). Similarly, 2,17β-dihydroxy-1,4-androstadien-3-one diacetate (IV; R' is H) was rearranged by acetic anhydride and sulfuric acid to give 4-methyl-1,3,5(10)-estratriene-1,2-17β-triol triacetate (V; R' is CH₃CO). The reaction is of course not limited to the use of acetic anhydride and sulfuric acid but can be effected by any lower-alkanoic acid anhydride in the presence of a strong mineral acid such as sulfuric acid, perchloric acid or phosphoric acid. The reaction takes place at ordinary temperatures.

The functional groups of compounds of Formulas III and V can be altered by conventional methods. The ether linkage of compounds of Formula III can be cleaved, as with hydrogen bromide or pyridine hydrochloride to give the free phenol, which in turn can be esterified or etherified by treating it with a lower-alkanoic acid anhydride, acid halide, lower-alkyl sulfate or diazo-lower-alkane. The hydroxy group at the 17-position can also be esterified or it can be oxidized to a 17-oxo group by the action of chromic acid. Similar transformations can be carried out on the functional groups of compounds of formula V as will be illustrated in the specific examples below.

The rearrangement of 2α-hydroxytestosterone is not limited to the use of p-toluenesulfonic acid in methanol, but can be effected by heating with any anhydrous hydrocarbon-sulfonic acid in a lower-alkanol. The hydrocarbon-sulfonic acid preferably has from one to about ten carbon atoms and can be a member of the aliphatic, cycloaliphatic or aromatic series, including such acids as methanesulfonic, ethanesulfonic, cyclohexanesulfonic, benzenesulfonic, p-toluenesulfonic and naphthalenesulfonic acids. The lower-alkanol can have from one to about six carbon atoms and thus includes such alcohols as methanol, ethanol, n-propanol, 2-propanol, butanol, isobutyl alcohol, n-pentanol, n-hexanol, and the like. The reaction takes place at temperatures between about 50° C. and about 150° C., conveniently at the reflux temperature of the alkanol.

Endocrinological evaluation of the compounds of Formula I has shown that they possess estrogenic activity. The estrogenic activity was evidenced by induced vaginal cornification in female rats, and no untoward effects were observed. These results indicate that the compounds are useful as estrogens, and they can be formulated and used in the same manner as known estrogenic agents.

The following examples will further illustrate the invention without the latter being limited thereby.

EXAMPLE 1

2-Methoxy-4-Methyl-1,3,5(10)-Estratrien-17β-Ol (III; R' Is $CH_3$) by Rearrangement of 2α-Hydroxytestosterone A mixture of 21.3 g. (0.07 mole) of 2α-hydroxytestosterone, M.P. 165–168° C., 2.7 g. of anhydrous p-toluenesulfonic acid and 350 ml. of methanol was refluxed for fifteen hours. The solvent was removed and the residue dissolved in 35 ml. of methylene dichloride. The latter solution was diluted with 400 ml. of ether, washed with 2 N sodium hydroxide and with saturated salt solution, and dried over potassium carbonate. The solvent was removed and the oily residue chromatographed on a column of 400 g. of silica gel in a solvent mixture containing 3 parts of methylene dichloride, 6 parts of ether and 11 parts of pentane. Elution of the column with a mixture containing 3 parts of ether and 7 parts of pentane brought out the desired product which was recrystallized twice from hexane to give 4.93 g. of 2-methoxy - 4 - methyl - 1,3,5(10) - estratrien - 17β - ol, M.P. 114.4–116.0° C. (corr.), $[\alpha]_D^{25} = +123.0°$ (1% in chloroform), ultraviolet maxima at 285 and 278 mμ (E=2,150 and 2,180) with a shoulder at 222 mμ (E=9,450).

By replacing the methanol in the foregoing preparation by ethanol, 1-propanol, 2-propanol, 1-butanol, or 1-hexanol, there can be obtained, respectively, 2-ethoxy-4-methyl-1,3,5(10)-estratrien-17β-ol (III; R' is $C_2H_5$), 2 - (n-propoxy) - 4 - methyl - 1,3,5(10) - estratrien-17β-ol (III; R' is $CH_3CH_2CH_2$), 2-isopropoxy-4-methyl-1,3,5(10)-estratrien-17β-ol (III; R' is $(CH_3)_2CH$), 2-(n-butoxy) - 4 - methyl - 1,3,5(10) - estratrien - 17β - ol (III; R' is $CH_3CH_2CH_2CH_2$), or 2-(n-hexyloxy)-4-methyl - 1,3,5(10) - estratrien - 17β - ol (III; R' is

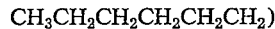

2 - methoxy - 4 - methyl - 1,3,5(10) - estratrien - 17β-ol can be converted to 17-lower-alkanoyl esters, for example, the formate, acetate, propionate, butyrate, isobutyrate, valerate, or caproate, by treating the 17β-hydroxy compound with the appropriate acid anhydride in the presence of pyridine. In the case of the formate a mixture of acetic anhydride and formic acid is employed.

EXAMPLE 2

2-Methoxy-4-Methyl-1,3,5(10)-Estratrien-17β-Ol (III; R' Is $CH_3$) by Rearrangement of 2α-Hydroxytestosterone Diacetate This rearrangement was carried out under conditions identical with those for the rearrangement of 2α-hydroxytestosterone and with the same molar proportions of reactants as in Example 1 above. The product obtained melted at 114–115° C. and showed no depression in melting point upon admixture with the product obtained in Example 1. The infrared spectra of the two samples were identical.

EXAMPLE 3

(a) 4-Methyl-1,3,5(10)-Estratriene-2,17β-Diol (III; R' Is H)

An intimate mixture of 2.0 g. of 2-methoxy-4-methyl-1,3,5(10)-estratrien-17β-ol and 16 g. of pyridine hydrochloride was heated at 165° C. for five hours, then cooled and treated with 200 ml. of water. The solid material was collected and chromatographed on a column of 100 g. of silica gel. The column was eluted with a mixture containing 7 parts of ether and 3 parts of pentane and finally with pure ether, and the product obtained was recrystallized twice from acetonitrile to give 1.34 g. of 4-methyl - 1,3,5(10) - estratriene - 2,17β - diol, M.P. 256.8–259.2° C. (corr.). $[\alpha]_D^{25} = +50.1°$ (1% in pyridine), ultraviolet maxima at 281 and 286 mμ (E=2,100 and 2,100) with a shoulder at 220 mμ (E=7,900).

(b) 4-Methyl-1,3,5(10)-Estratriene-2,17β-Diol 2-Diethylphosphate

A mixture of 1.04 g. of 4-methyl-1,3,5(10)-estratriene-2,17β-diol, 10 ml. of carbon tetrachloride and 10 ml. of dioxane was treated with 0.54 ml. of diethylphosphite, B.P. 67.5–68.5° C. (6 mm.) and 0.57 ml. of triethylamine, and the mixture was shaken for sixteen hours at room temperature. The solvent was removed by warming in vacuo, and the residue was shaken with water and ether. The ether layer was separated, washed once with 2 N hydrochloric acid, three times with 2 N sodium hydroxide, once with saturated sodium chloride, and dried over potassium carbonate. The solvent was removed to give 4-methyl-1,3,5(10)-estratriene-2,17β-diol 2-diethylphosphate as an oil which was used in the subsequent reaction without further purification.

(c) 4-Methyl-1,3,5(10)-Estratrien-17β-Ol

The oily phosphate ester obtained in part (b) above was dissolved in 40 ml. of tetrahydrofuran and 60 ml. of liquid ammonia was added. Sodium (0.25 g.) was added with stirring, the solution was stirred for five minutes, 2 ml. of absolute ethanol was added and the ammonia was allowed to evaporate. Water (20 ml.) was added and the tetrahydrofuran was removed by warming in vacuo. The aqueous suspension remaining was extracted twice with ether and the ether extracts were washed twice with saturated sodium chloride solution and dried over potassium carbonate. The ether solution was evaporated, and the residue was dissolved in a mixture containing 5 parts of ether and 95 parts of pentane and placed on a column of 60 g. of silica gel. The column was eluted with pentane containing 5% of ether followed by pentane containing 10% of ether, and the product obtained was recrystallized three times from methanol to give 4-methyl-1,3,5(10)-estratrien-17β-ol, M.P. 114–115.5° C. (corr.), $[\alpha]_D^{25} = +59°$ (1% in dioxane). The melting point of the compound was undepressed upon admixture with a sample of the compound obtained by the method of Gentles et al., J. Am. Chem. Soc. 80, 3702 (1958), and the infrared spectra of the two materials were identical.

EXAMPLE 4

*2-Methoxy-4-Methyl-1,3,5(10)-Estratrien-17β-Ol (III; R' Is CH₃) From 17β-Hydroxy-2-Methoxy-1,4-Androstadien-3-One*

To a stirred solution of 2.0 g. of lithium aluminum hydride in 100 ml. of tetrahydrofuran was added during ten minutes a solution of 1.5 g. of 17β-hydroxy-2-methoxy-1,4-androstadien-3-one, M.P. 215–218.5° C., in 85 ml. of tetrahydrofuran. The mixture was refluxed for one hour, then cooled, treated with 5 ml. of water and filtered. The filtrate was concentrated in vacuo, and the residue was chromatographed on a column of 100 g. of activated magnesium silicate ("Florisil") in a mixture containing 3 parts of ether and 7 parts of pentane. The desired product was eluted first and was recrystallized once from hexane to give 0.87 g. of 2-methoxy-4-methyl-1,3,5(10)-estratrien-17β-ol, M.P. 113–114.5° C. (corr.). This material showed no depression in melting point upon admixture of a sample of the compound obtained above in Example 1, and the infrared spectra of the two samples were identical.

EXAMPLE 5

*2-Methoxy-4-Methyl-1,3,5(10)-Estratrien-17-One (I; R Is H, R' Is CH₃, R" Is O)*

A solution of 1.51 g. of 2-methoxy-4-methyl-1,3,5(10)-estratrien-17β-ol in 65 ml. of benzene was shaken for fifteen minutes with 6.5 ml. of chromic acid solution (prepared from 84 g. of sodium dichromate dihydrate, 63 ml. of acetic acid, 114 ml. of concentrated sulfuric acid and 372 ml. of water). Ether was then added to the solution, the layers were separated and the ether layer was washed with water and saturated sodium bicarbonate solution, and dried over anhydrous sodium sulfate.

The ether solution was concentrated and the residue dissolved in a mixture of 1 part of ether and 4 parts of pentane and chromatographed on a column of 60 g. of silica gel. The product was eluted readily and recrystallized twice from an ether-pentane mixture to give 0.7 g. of 2-methoxy-4-methyl-1,3,5(10)-estratrien-17-one, M.P. 135.8–137.0° C. (corr.), $[\alpha]_D^{25} = +112.7°$ (1% in chloroform), ultraviolet maxima at 279 and 284 mμ (E=2,000 and 2,000) with a shoulder at 222 mμ (E=8,700).

EXAMPLE 6

*1,17β-Diacetoxy-2-Methoxy-4-Methyl-1,3,5(10)-Estratriene (V; R' Is CH₃, Acyl Is COCH₃)*

A suspension of 2.23 g. of 17β-hydroxy-2-methoxy-1,4-androstadien-3-one, M.P. 216–220° C., in 50 ml. of acetic anhydride was treated with 0.5 g. of concentrated sulfuric acid. The suspension was shaken for ten minutes to effect solution and the solution allowed to stand at room temperature for three and one-half hours. The solution was then poured into 1 liter of water and the mixture was extracted with three portions of methylene dichloride. The extracts were washed with saturated sodium bicarbonate solution and with water, dried over potassium carbonate and concentrated in vacuo. The residue was dissolved in a mixture of 1 part of ether and 4 parts of pentane and chromatographed on a column of 60 g. of silica gel. The product was eluted with the same solvent mixture and recrystallized from 4 ml. of methanol to give 1.56 g. of 1,17β-diacetoxy-2-methoxy-4-methyl-1,3,5(10)-estratriene in the form of colorless prisms, M.P. 135.0–136.8° C. (corr.), $[\alpha]_D^{25} = +104.4°$ (1% in chloroform).

By replacing the acetic anhydride in the foregoing preparation by propionic anhydride, butyric anhydride, or caproic anhydride, there can be obtained, respectively, 1,17β-dipropionoxy-2-methoxy - 4 - methyl - 1,3,5(10)-estratriene (V; R' is CH₃, acyl is COCH₂CH₃), 1,17β-dibutyryloxy-2-methoxy-4-methyl-1,3,5(10) - estratriene (V; R' is CH₃, acyl is COCH₂CH₂CH₃), or 1,17β-dicaproyloxy-2-methoxy-4-methyl-1,3,5(10) - estratriene (V; R' is CH₃, acyl is CO(CH₂)₄CH₃).

EXAMPLE 7

*1,2,17β-Triacetoxy-4-Methyl-1,3,5(10)-Estratriene (V; R' Is CH₃CO, Acyl Is COCH₃)*

A stirred suspension of 1.0 g. of 2,17β-diacetoxy-1,4-androstadien-3-one, M.P. 207–209° C., in 25 ml. of acetic anhydride was treated with a solution of 0.5 g. of concentrated sulfuric acid in 5 ml. of acetic anhydride. The solution was allowed to stand at room temperature for four and one-half hours and was then poured into 400 ml. of water with stirring. The solid product was collected by filtration, air dried, and recrystallized twice from methanol to give 0.96 g. of 1,2,17β-triacetoxy-4-methyl-1,3,5(10)-estratriene in the form of colorless plates, M.P. 176.0–178.2° C. (corr.), $[\alpha]_D^{25} = +94.4°$ (1% in chloroform), ultraviolet maxima at 269 and 276 mμ (E=530 and 520); infrared maxima at 5.63 and 5.76 μ.

EXAMPLE 8

*4-Methyl-1,3,5(10)-Estratriene-1,2,17β-Triol (I; R Is OH, R' Is H, R" Is (H)(OH))*

A solution of 14.1 g. of 1,2,17β-triacetoxy-4-methyl-1,3,5(10)-estratriene in 300 ml. of methanol was added to a solution of 13.1 g. of solid 85% potassium hydroxide in 65 ml. of water, and the mixture was refluxed for two hours under nitrogen. Acetic acid (13 ml.) was then added, and the solid which separated was collected by filtration and washed with water. The product was recrystallized several times from methanol to give 4-methyl-1,3,5(10)-estratriene-1,2,17β-triol in the form of opaque needles, M.P. 209.0–210.4° C. (corr.), $$[\alpha]_D^{25} = +167.6°$$

(1% in chloroform).

EXAMPLE 9

*2-Methoxy-4-Methyl-1,3,5(10)-Estratriene-1,17β-Diol*

A mixture of 5.8 g. of 1,17β-diacetoxy-2-methoxy-4-methyl-1,3,5(10)-estratriene, 2.9 g. of potassium hydroxide, 8 ml. of water and 75 ml. of methanol was refluxed for one and one-half hours. The solution was cooled, treated with 2 ml. of glacial acetic acid and concentrated in vacuo. The residue was shaken with ether and water, the layers separated, and the ether layer washed with saturated sodium bicarbonate solution and saturated sodium chloride solution, and dried over anhydrous sodium sulfate. The ether solution was concentrated and the residue recrystallized from ethyl acetate to give 3.35 g. of 2-methoxy-4-methyl-1,3,5(10)-estratriene-1,17β-diol, M.P. 175.2–176.8° C. (corr.), $[\alpha]_D^{25} = +165.0°$ (1% in chloroform), ultraviolet maximum at 288 mμ (E=2,600).

I claim:
1. A compound of the formula

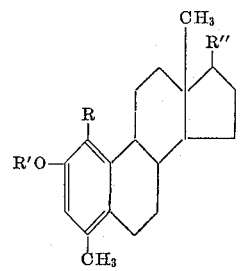

wherein R is a member of the group consisting of hydrogen, hydroxy, lower-alkoxy and lower-alkanoyloxy; R' is a member of the group consisting of hydrogen, lower-alkyl and lower-alkanoyl; and R" is a member of the group consisting of (H)(β-OH) and (H)(β-O-lower-alkanoyl), and O.

2. 2-methoxy-4-methyl-1,3,5(10)-estratrien-17β-ol.
3. 4-methyl-1,3,5(10)-estratriene-2,17β-diol.
4. 2-methoxy-4-methyl-1,3,5(10)-estratrien-17-one.
5. 1,2,17β-triacetoxy-4-methyl-1,3,5(10)-estratriene.
6. 2 - methoxy-4-methyl - 1,3,5(10) - estratriene - 1,17β-diol.
7. 1,17β-diacetoxy - 2 - methoxy - 4 - methyl - 1,3,5(10)-estratriene.
8. 4-methyl-1,3,5(10)-estratriene-1,2,17β-triol.
9. A process for preparing a 2-lower-alkoxy-4-methyl-1,3,5(10)-estratrien-17β-ol which comprises heating a member of the group consisting of 2α-hydroxytestosterone and di-lower-alkanoic acid esters thereof with an anhydrous hydrocarbon sulfonic acid and a lower-alkanol.
10. A process for preparing 2-methoxy-4-methyl-1,3,5(10)-estratrien-17β-ol which comprises heating 2α-hydroxytestosterone with anhydrous p-toluenesulfonic acid and methanol.
11. A process for preparing a 2-lower-alkoxy-4-methyl-1,3,5(10)-estratrien-17β-ol which comprises heating a 17β-hydroxy-2-lower-alkoxy-1,4-androstadien-3-one with lithium aluminum hydride in an inert reaction medium and contacting the resulting product with activated magnesium silicate.
12. A process for preparing 2-methoxy-4-methyl-1,3,5(10)-estratrien-17β-ol which comprises heating 17β-hydroxy-2-methoxy-1,4-androstadien-3-one with lithium aluminum hydride in an inert reaction medium and contacting the resulting product with activated magnesium silicate.

13. A process for preparing a compound having the formula

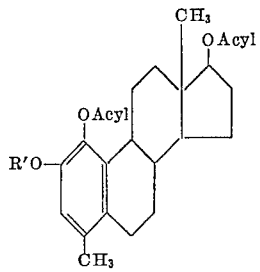

wherein R' is a member of the group consisting of lower-alkyl and lower-alkanoyl, and acyl is lower-alkanoyloxy, which comprises treating with a lower-alkanoic acid anhydride in the presence of a strong mineral acid a compound having the formula

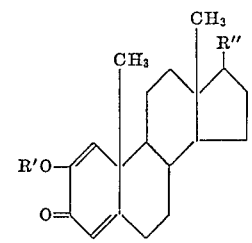

wherein R' has the same meaning given above and R" is a member of the group consisting of (H)(β-OH) and (H)(β-O-lower-alkanoyl).

14. A process for preparing 1,17β-diacetoxy-2-methoxy-4-methyl-1,3,5(10)-estratriene which comprises treating 17β-hydroxy-2-methoxy - 1,4 - androstadien - 3 - one with acetic anhydride in the presence of sulfuric acid.

15. A process for preparing 1,2,17β-triacetoxy-4-methyl-1,3,5(10)-estratriene which comprises treating 2,17β-diacetoxy-1,4-androstadien-3-one with acetic anhydride in the presence of sulfuric acid.

No references cited.

UNITED STATES PATENT OFFICE
CERTIFICATE OF CORRECTION

Patent No. 3,037,033            May 29, 1962

Robert L. Clarke

It is hereby certified that error appears in the above numbered patent requiring correction and that the said Letters Patent should read as corrected below.

Column 2, lines 20 to 30, Formula III should appear as shown below instead of as in the patent:

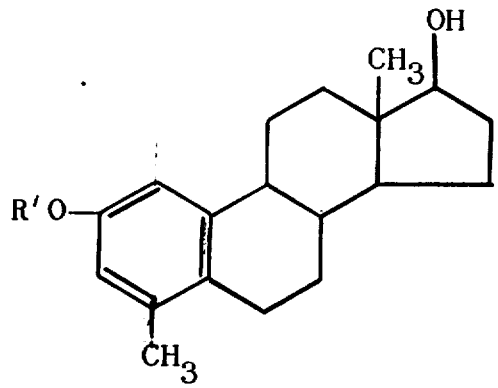

same column 2, lines 35 to 45, Formula V should appear as shown below instead of as in the patent:

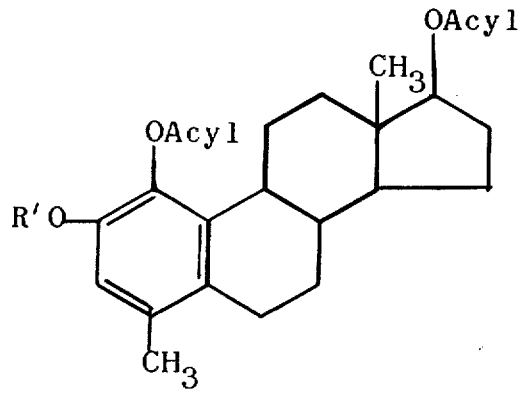

Signed and sealed this 13th day of November 1962.

(SEAL)
Attest:
ERNEST W. SWIDER
Attesting Officer

DAVID L. LADD
Commissioner of
Patents